US012299178B2

(12) United States Patent
Dawson

(10) Patent No.: US 12,299,178 B2
(45) Date of Patent: May 13, 2025

(54) ELECTRONIC DEVICES FOR MEDIA FILE VERIFICATION

(71) Applicant: SONY GROUP CORPORATION, Tokyo (JP)

(72) Inventor: Thomas Dawson, Escondido, CA (US)

(73) Assignee: SONY GROUP CORPORATION, Tokyo (JP)

( * ) Notice: Subject to any disclaimer, the term of this patent is extended or adjusted under 35 U.S.C. 154(b) by 195 days.

(21) Appl. No.: 17/949,846

(22) Filed: Sep. 21, 2022

(65) Prior Publication Data

US 2024/0095405 A1 Mar. 21, 2024

(51) Int. Cl.

*G06F 21/64* (2013.01)
*G06F 16/245* (2019.01)
*G06F 16/27* (2019.01)

(52) U.S. Cl.

CPC .............. *G06F 21/64* (2013.01); *G06F 16/27* (2019.01); *G06F 16/245* (2019.01)

(58) Field of Classification Search

CPC ......... G06F 16/27; G06F 16/245; G06F 21/64
See application file for complete search history.

(56) References Cited

U.S. PATENT DOCUMENTS 7,961,949 B2 6/2011 Levy et al.
2021/0037270 A1* 2/2021 Taylor .................. H04L 9/3242
2021/0312561 A1* 10/2021 Speasl .................. G06F 21/602
2021/0409489 A1* 12/2021 Speasl .................. H04L 63/123
2022/0312059 A1* 9/2022 Laul .................... G06F 21/1063
2023/0206634 A1* 6/2023 Ajgaonkar ........... G06V 10/764
382/100

FOREIGN PATENT DOCUMENTS

BR PI1003850 B1 8/2020
CN 111917558 B 3/2021

OTHER PUBLICATIONS

Notice of Allowance for U.S. Appl. No. 17/949,898 dated Jul. 5, 2023.

* cited by examiner

*Primary Examiner* — Dangelino N Gortayo
(74) *Attorney, Agent, or Firm* — CHIP LAW GROUP

(57) ABSTRACT

An electronic device and a method for implementation for media file verification are disclosed. The electronic device receives first information associated with a first media file from each database of a plurality of databases. Each database of the plurality of databases is associated with a separate entity. The electronic device receives a second media file corresponding to the first media file. The electronic device determines a second information associated with the received second media file. The electronic device compares the first information received from each of the plurality of databases with one another. The electronic device determines the received first information as unaltered based on the comparison. The electronic device compares the first information and the second information. The electronic device determines the received second media file as unaltered. The electronic device renders verification information.

20 Claims, 8 Drawing Sheets

ELECTRONIC DEVICES FOR MEDIA FILE VERIFICATION

This application makes reference to U.S. patent application Ser. No. 17/949,898 which was filed on Sep. 21, 2022. The above stated Patent Application is hereby incorporated herein by reference in its entirety

FIELD

Various embodiments of the disclosure relate to media files. More specifically, various embodiments of the disclosure relate to an electronic device and method for media file verification.

BACKGROUND

Advancements in software technology have led to an increase in generation and consumption of media files. Examples of the media files may include, but are not limited to, videos, images, audios, graphics, animation, or multimedia. Oftentimes, the media files may be modified or tampered by a user and the changes may be unnoticeable. The user may alter the media file using various computer applications or online tools. For example, the user may remove certain portion of an original video and add certain extra frames in the original video that may not be present in the original video. In some cases, the media file may include information that may be critical for some purposes, such as, for legal proceedings, surveillance, and the like. Hence, an authenticity or integrity of a media file may need to be determined. For example, an accused party may present a tampered video in a court of law. The court may issue an erroneous decision based on the tampered video. Therefore, the authenticity of the video may need to be established.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for media file verification is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
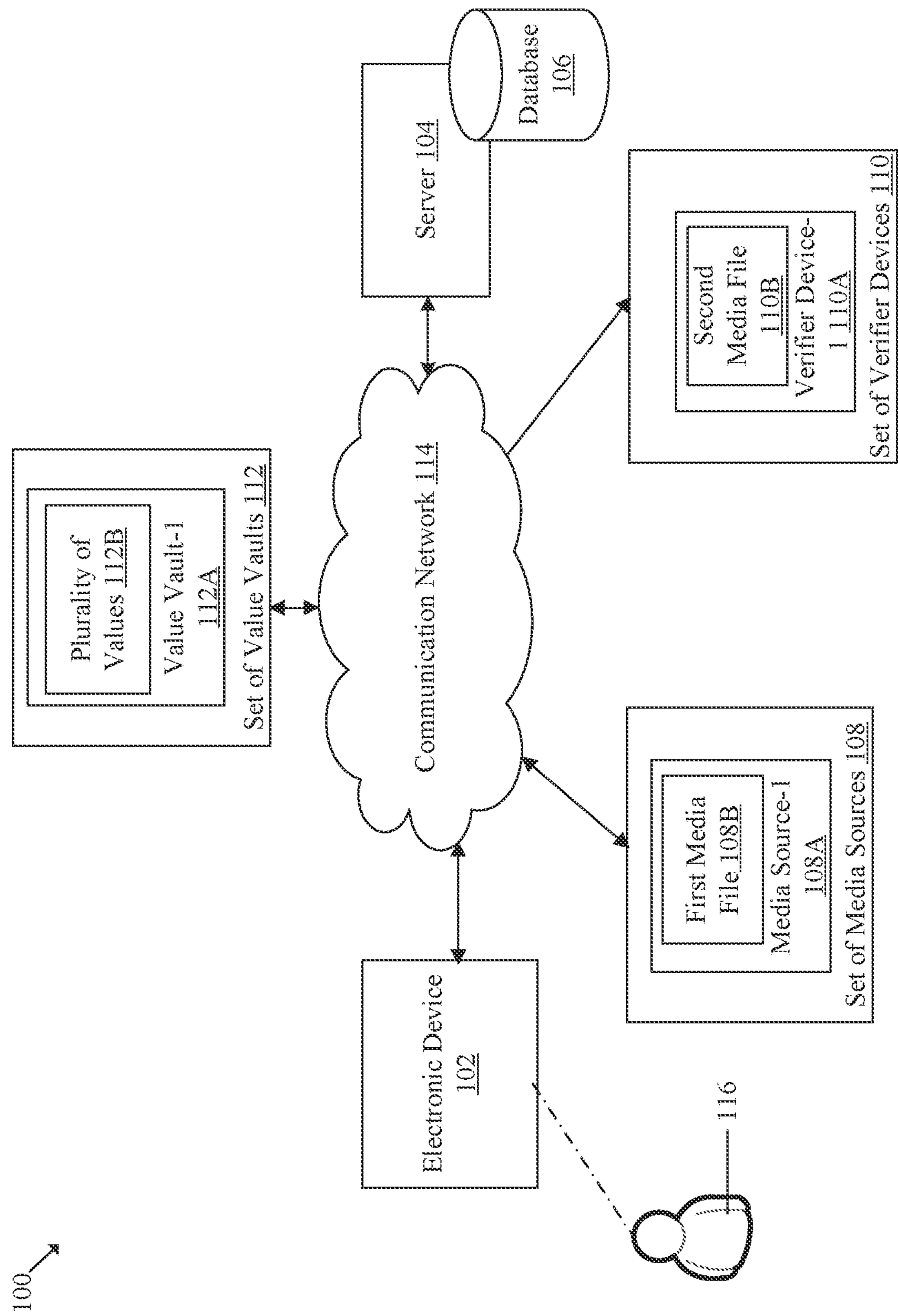
FIG. 1 is a block diagram that illustrates an exemplary network environment for implementation of media file verification, in accordance with an embodiment of the disclosure.

The following described implementation may be found in the electronic device and method for media file verification. Exemplary aspects of the disclosure may provide an electronic device that may verify a media file. The electronic device may receive first information associated with a first media file from each database of a plurality of databases. Each database of the plurality of databases may be associated with a separate entity. The electronic device may further receive a second media file corresponding to the first media file. The electronic device may further determine second information associated with the received second media file, based on content of the received second media file. The electronic device may compare the first information received from each of the plurality of databases with one another. The electronic device may further determine the received first information as unaltered, based on the comparison. Further, the electronic device may compare the received first information and the determined second information. The electronic device may further determine the received second media file as unaltered, based on the comparison of the received first information and the determined second information and based on the determination that the received first information is unaltered. The electronic device may further render verification information based on the determination that the received second media file is unaltered.

Typically, the media files may be modified by a user using various computer applications or online tools. For example, the user may remove certain portions of an original video and add certain extra frames in the video that may not be present in the original video. In some cases, the media file may include information that may be critical for some purposes, such as, legal proceedings or surveillance. Hence, an authenticity of the media file may need to be determined. The electronic device may determine the received second media file as unaltered, based on the comparison of the received first information and the determined second information and based on the determination that the received first information is unaltered. The electronic device may render verification information based on the determination that the received second media file is unaltered. As the first information may be received from multiple databases maintained by separate entities, in cases where values in the first information are altered at one of the databases, the corresponding values in the first information stored at the other databases may still be unaffected. The comparison between the first information received from the various databases may be used to determine which of the databases altered the values in the first information. Further, once the received first information (associated with the first media file) is determined (based on the comparison) as unaltered, the electronic device may compare the received first information with the determined second information associated with the second media file. The comparison between the first information and the second information may determine whether the source of the second media file altered the second media file. Thus, the authenticity and integrity of the second media file with respect to an original media file (i.e., the first media file) may be determined based on the two comparisons.

FIG. 1 is a block diagram that illustrates an exemplary network environment for implementation of media file verification, in accordance with an embodiment of the disclosure. With reference to FIG. 1, there is shown a network environment 100. The network environment 100 may include an electronic device 102, a server 104, a database 106, a set of media sources 108 (including a media source-1 108A), a set of verifier devices 110 (including a verifier device-1 110A), a set of value vaults 112 (including a value vault-1 112A), and a communication network 114. The media source-1 108A may include a first media file 108B. The verifier device-1 110A may include a second media file 110B. The value vault-1 112A may include a plurality of values 112B including, for example, first information associated with the first media file 108B. The set of value vaults 112 may be implemented by the database 106. Further, the set of media sources 108 or the set of verifier devices 110 or a combination thereof may be implemented by the electronic device 102. The electronic device 102, the server 104, the database 106, the set of media sources 108, the set of verifier devices 110, and the set of value vaults 112 may be communicatively coupled to one another, via the communication network 114. In FIG. 1, there is further shown a user 116, who may be associated with or operate the electronic device 102.

The electronic device 102 may include suitable logic, circuitry, interfaces, and/or code that may be configured receive the first media file 108B. The electronic device 102 may receive first information associated with a first media file such as, the first media file 108B, from each database of a plurality of databases, such as, the set of value vaults 112. Each database of the plurality of databases may be associated with a separate entity. The electronic device 102 may receive a second media file such as, the second media file 110B, corresponding to the first media file 108B. The electronic device 102 may determine second information associated with the received second media file 110B, based on content of the received second media file 110B. The electronic device 102 may determine whether the second media file 110B is unaltered based on the received first information and the determined second information. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured to compare the first information received from each of the plurality of databases with one another. The server 104 may be configured to determine the received first information as unaltered, based on the comparison. The server 104 may be configured to compare the received first information and the determined second information. The server 104 may be configured to determine the received second media file 110B as unaltered, based on the comparison of the received first information and the determined second information and based on the determination that the received first information is unaltered. The server 104 may be configured to render verification information based on the determination that the received second media file 110B is unaltered. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the first information. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for the first information. In response, the device of the database 106 may be configured to retrieve and provide the queried first information to the electronic device 102 based on the received query.

In some embodiments, the database 106 may be hosted on a plurality of servers stored at same or different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The set of media sources 108 may include suitable logic, interfaces, circuitry, and/or code that may be configured to generate, receive, and/or store media files. For example, the media source-1 108A of the set of media sources 108 may be configured to store the first media file 108B. The set of media sources 108 may be further configured to determine the first information associated with each of the stored media files. The determination of the first information (associated with a media file) may be based on content of the corresponding media file. The set of media sources 108 may transmit the determined first information (associated with the media file) to each of the set of value vaults 112 for storage. For example, the media source-1 108A may transmit the first information associated with the first media file 108B to the set of value vaults 112 including the value vault-1 112A, for storage. Examples of each of the set of media sources 108 may include, but are not limited to, a computing device, a smartphone, a cellular phone, a mobile phone, a gaming device, a mainframe machine, a server, a computer workstation, a database, and/or a consumer electronic (CE) device.

The set of verifier devices 110 may include suitable logic, interfaces, circuitry, and/or code that may be configured to generate, receive, and/or store media files to be verified. For example, the verifier device-1 110A of the set of verifier devices 110 may be configured to store the second media file 110B. The set of verifier devices 110 may be further configured to transmit the stored media files to the electronic device 102, for verification. For example, the verifier device-1 110A of the set of verifier devices 110 may be configured to transmit the stored second media file 110B to the electronic device 102 for verification. In certain embodiments, the set of verifier devices 110 may be further configured to determine the second information associated with each of the media file stored on the set of verifier devices 110. In such case, the set of verifier devices 110 may transmit the determined second information along with the stored media file to the electronic device 102, for verification. Examples of each of the set of verifier devices 110 may include, but are not limited to, a computing device, a smartphone, a cellular phone, a mobile phone, a gaming device, a mainframe machine, a server, a computer workstation, a database, and/or a consumer electronic (CE) device.

The set of value vaults 112 may include suitable logic, interfaces, circuitry, and/or code that may be configured to store the plurality of values 112B. For example, each of the set of value vaults 112 (including the value vault-1 112A) may be configured to store the plurality of values 112B (including, for example, the first information associated with the first media file 108B, which may be received from the media source-1 108A). Each of the set of value vaults 112 may receive a query for the first information associated with the first media file 108B. Based on the received query, each of the set of value vaults 112 may transmit the first information associated with the first media file 108B to the electronic device 102. In an embodiment, each of the set of value vaults 112 may correspond to a database of a plurality of databases, wherein each database of the plurality of databases may be associated with a separate entity (e.g., user or organization). As the plurality of databases may be associated with separate entities, the plurality of databases may have no contact, no cooperation, and/or no collusion with each other. In certain embodiments, each of the set of value vaults 112 may correspond to a node of a distributed ledger. Examples of each of the set of value vaults 112 may include, but are not limited to, a computing device, a smartphone, a cellular phone, a mobile phone, a gaming device, a mainframe machine, a server, a computer workstation, a database, a distributed ledger node, and/or a consumer electronic (CE) device.

The communication network 114 may include a communication medium through which the electronic device 102, the set of media sources 108, the set of verifier devices 110, the set of value vaults 112, and the server 104 may communicate with one another.

The communication network 114 may be one of a wired connection or a wireless connection. Examples of the communication network 114 may include, but are not limited to, the Internet, a cloud network, Cellular or Wireless Mobile Network (such as Long-Term Evolution and $5^{th}$ Generation (5G) New Radio (NR)), a satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In some embodiments, the network environment 100 may include a distributed ledger corresponding to the set of value vaults 112. The distributed ledger may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, whereby all participants or nodes store all the plurality of blocks. Further, the distributed ledger may include an operating system which may allow for deployment of the group of smart contracts between multiple parties, for example, the user 116 and the electronic device 102.

The distributed ledger may be a chain of blocks which uses accounts as state objects and a state of each account can be tracked by the chain. The accounts represent identities of users, mining nodes, or automated agents. All the blocks of data operations or the smart contract are associated with the accounts on the chain of blocks. By way of example, and not limitation, the distributed ledger may be an Ethereum blockchain which may use accounts as state objects and a state of each account can be tracked by the Ethereum blockchain. The accounts represent identities of users, mining nodes, or automated agents. All the blocks of data operations or the smart contract are associated with the accounts on the Ethereum Blockchain. The scope of the disclosure may not be limited to the implementation of the distributed ledger as the Ethereum blockchain. In some embodiments, the distributed ledger may be implemented as a Hyperledger blockchain, or a Corda blockchain. Other implementations of the distributed ledger may be possible in the present disclosure, without a deviation from the scope of the present disclosure.

In operation, the electronic device 102 may be configured to receive the first information associated with the first media file 108B from each database of the plurality of databases, such as, the set of value vaults 112. Each database of the plurality of databases may be associated with the separate entity. The first media file 108B may be an image, an audio, or a video. The first media file 108B may be live or pre-recorded. For example, the first media file 108B may be, but is not limited to, an image of a crime scene, an audio of conversations between police officers, video recording of a robbery, and the like. The first information may include information related to properties of the received first media file 108B such as, color values, amplitude, frequency, pitch, and the like. The first information may be stored in each of the plurality of databases. The plurality of databases may be third party storage devices such as, the set of value vaults 112 that may store the first information associated with the first media file 108B. Each of the plurality of database may not communicate with each other. Therefore, even if one database is compromised leading to alteration of the stored first information, the other databases of the plurality of database may remain unaffected. The electronic device 102 may request each of the plurality of databases to provide the first information associated with the first media file 108B stored on the respective databases of the plurality of databases. Each of the plurality of databases may verify the request to determine the authenticity of the request of the electronic device 102 and may provide the first information based on the verification. Details related to the storage of the first information on each of the plurality of database are provided, for example, in FIG. 3.

The electronic device 102 may be further configured to receive the second media file 110B corresponding to the first media file 108B. The received second media file 110B may be a media file that needs to be verified to determine whether it matches with the first media file 108B. The second media file may be also a video, an image, or an audio. Details related to the second media file are provided further, for example, in FIG. 3.

The electronic device 102 may be further configured to determine the second information associated with the received second media file 110B, based on the content of the received second media file 110B. The second information may correspond to the first information and may be associated with certain properties of the received second media file 110B. For example, the second information may include information related to the received second media file 1101B, such as, color values, amplitude, frequency, pitch, and loudness, and the like. Details related to the second information are provided further, for example, in FIG. 3.

The electronic device 102 may be further configured to compare the first information received from each of the plurality of databases with one another. The first information received from each of the plurality of databases may be matched with one another to determine whether the first information received from each of the plurality of databases are same or not. In cases where the first information received from any of the database of the plurality of databases does not match with the first information received from other databases, then the corresponding database may have been compromised. However, since each of the plurality of databases may not communicate with each other, all the databases of the plurality of databases may not be compromised at once. In an embodiment, the correct version of the first information may be obtained based on a majority voting among the values of the first information received from each of the plurality of databases. Details related to the comparison of the first information are provided further, for example, in FIG. 3.

The electronic device 102 may be further configured to determine the received first information as unaltered, based on the comparison. As discussed, the first information received from each of the plurality of databases may be compared with one another. In cases where the first information received from each of the plurality of databases matches with one another, then the received first information may be determined as unaltered. Details related to the determination that the received first information as unaltered are provided further, for example, in FIG. 3.

The electronic device 102 may be further configured to compare the received first information and the determined second information. The received first information and the determined second information may be compared to determine whether they are same or not. Details related to the comparison of the received first information and the determined second information are provided further, for example, in FIG. 3.

The electronic device 102 may be further configured to determine the received second media file 110B as unaltered, based on the comparison of the received first information and the determined second information and based on the determination that the received first information is unaltered. If the received first information and the determined second information match each other, and the received first information is determined as unaltered, then the second media file 110B may also be determined as unaltered and may be same as the received first media file 108B. Details related to the determination of the received second media file as unaltered are provided further, for example, in FIG. 3.

The electronic device 102 may be further configured to render verification information based on the determination that the received second media file 110B is unaltered. The verification information may include an indication of whether or not the received second media file 110B is determined as unaltered. The verification information may be rendered on a display (e.g., a display device 210 of FIG. 2) of the electronic device 102. Also, the received second media file 110B may be rendered on the display (e.g., a display device 210 of FIG. 2) of the electronic device 102, based on the determination that the received second media file 110B is unaltered. Details related to the rendering of the verification information are provided further, for example, in FIG. 3.

Figure 2:
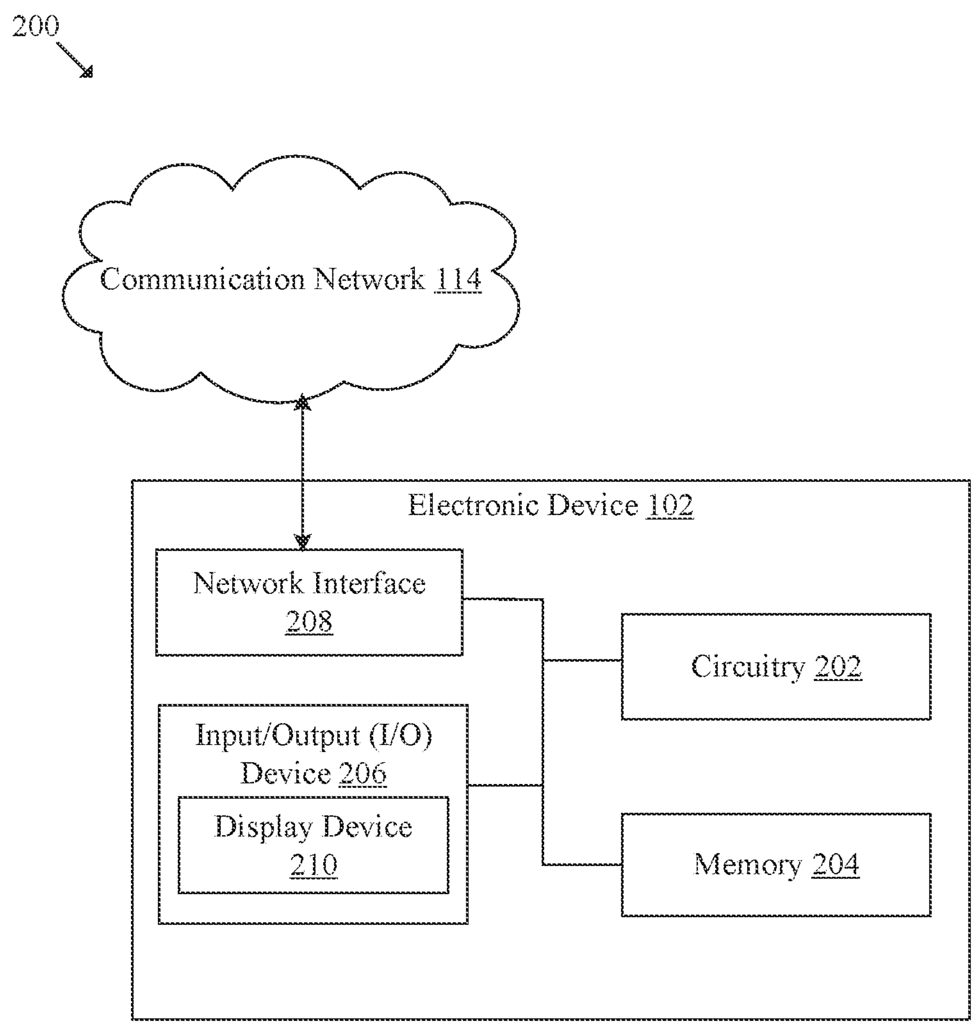
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, and a network interface 208. The input/output (I/O) device 206 may include a display device 210.

The circuitry 202 may include suitable logic, circuitry, and/or interfaces that may be configured to execute program instructions associated with different operations to be executed by the electronic device 102. The operations may include the first information reception, the second media file reception, the second information determination, the comparison amongst the received first information, first information verification (as unaltered or not), the comparison between the first information and the second information, second media file verification (as unaltered or not), and verification information rendering. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be configured to store media files, such as, the first media file 108B and/or the second media file 110B. The memory 204 may be configured to store the received first information and/or the determined second information. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input indicative of a selection of the first media file 108B and/or the second media file 110B. The I/O device 206 may be further configured to display or render the verification information, the selected first media file 108B and/or the second media file 110B. The I/O device 206 may include the display device 210. Examples of the I/O device 206 may include, but are not limited to, a display (e.g., a touch screen), a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102, the set of media sources 108, the set of verifier devices 110, the set of value vaults 112, and the server 104, via the communication network 114. The network interface 208 may be implemented by use of various known technologies to support wired or wireless communication of the electronic device 102 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display or render the verification information, the first media file 108B and/or the second media file 110B. The display device 210 may be a touch screen which may enable a user (e.g., the user 116) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation of media file verification are described further, for example, in FIG. 3.

Figure 3:
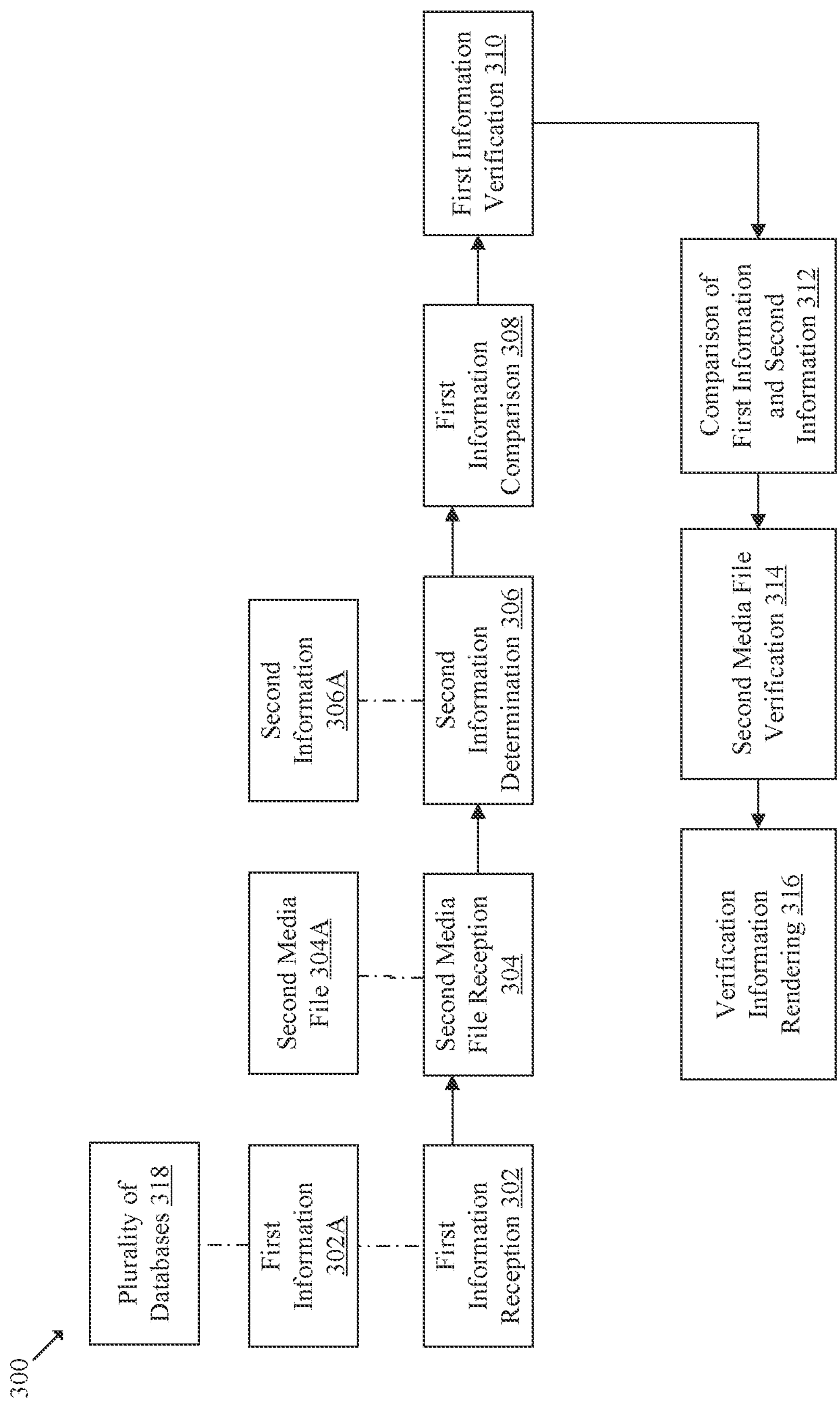
FIG. 3 is a diagram that illustrates an exemplary processing pipeline for implementation of media file verification, in accordance with an embodiment of the disclosure.

FIG. 3 is a diagram that illustrates an exemplary processing pipeline for implementation of media file verification, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations from 302 to 316 for implementation of media file verification. The exemplary operations 302 to 316 may be executed by any computing system, for example, by the electronic device 102 of FIG. 1 or by the circuitry 202 of FIG. 2. The exemplary processing pipeline 300 further illustrates first information 302A, a second media file 304A, second information 306A, and a plurality of databases 318.

At 302, an operation for first information reception may be executed. The circuitry 202 may be configured to receive the first information 302A associated with the first media file (e.g., the first media file 108B) from each database of the plurality of databases 318. Each database of the plurality of databases 318 may be associated with a separate entity. It may be appreciated that the first media file 108B may correspond to an image, an audio, or a video. In an embodiment, the first media file 108B may be pre-recorded such as, a pre-recorded video or a pre-recorded audio and stored on a storage device such as, the memory 204 of FIG. 2. In another embodiment, the first media file 108B may be a live media stream such as, a live video, a live audio, and the like. An exemplary method and system for generation (or determination) of the first information for distributed video content verification (for example, in case the first media file is a pre-recorded video or a live video) is described further, for example, in U.S. patent application Ser. No. 17/949,898, which was filed on Sep. 21, 2022.

The first information 302A associated with the first media file 108B may be received from each database of the plurality of databases 318. In an example, the first information 302A may include properties associated with the received first media file 108B, such as, color values, amplitude, frequency, pitch, other audio parameters, and/or other image parameters (like pixel values). Parameters or values in the first information 302A may be different for different types of media associated with the received first media file 108B. For example, if the first media file 108B is a video, then the received first information 302A may include one or more color values, and/or one or more audio values of a plurality of frames of the video. If the received first media file 108B is an audio, then the first information 302A may include one or more audio values of a plurality of frames of the audio. If the received first media file is an image, then the first information 302A may include one or more color values of a plurality of pixels in the image. The plurality of databases 318 may be include more than two databases, such as three databases. In an example, the plurality of databases 318 may correspond to the set of value vaults 112. The plurality of databases 318 may have no contact, no cooperation, and/or no collusion with each other. The transmitted first information 302A may be stored in the plurality of databases 318. When a given media file is to be verified, the first information corresponding to the given media file may be fetched from each of the plurality of databases 318 and may be compared with the second information determined for the given media file. However, it may be noted that a database of the plurality of databases 318 may be compromised that may lead to incorrect verification of the given media file. Further, not all databases of the plurality of databases 318 may be compromised at one time, as each database may be associated with a separate user or entity. As each database may be associated with a separate user or entity, the plurality of databases may not communicate or collude with each other.

The circuitry 202 may receive from each of the plurality of databases 318, the first information 302A associated with the first media file 108B. The circuitry 202 may request each of the plurality of databases 318 to provide the first information 302A associated with the received first media file 108B. Each of the plurality of databases 318 may verify the request from the circuitry 202 to determine an authenticity of the request. For example, the request may be verified based on an identity of the electronic device 102 that may be transmitted to each database along with the request. Each database may provide the first information 302A based on a successful verification of the request. For example, the plurality of databases 318 may include a database A, a database B, and a database C that may store versions A, B, and C, respectively, of the first information associated with the received first media file 108B. The circuitry 202 may receive the versions of the first information, such as, the first information A, the first information B, and the first information C associated with the received first media file 108B from each of the database A, the database B, and the database C, respectively.

In an embodiment, each database of the plurality of databases 318 may correspond to a node of a distributed ledger. For example, the distributed ledger may store several blocks of data in the form of chain (e.g., a blockchain). The distributed leger of the present disclosure may be associated with each database of the plurality of databases 318 and may store the first information 302A for each database of the plurality of databases 318 securely.

At 304, an operation for a second media file reception may be executed. The circuitry 202 may be further configured to receive the second media file 304A corresponding to the first media file 108B. The received second media file 304A may be a media file that is to be verified to determine whether it matches with the first media file 108B or not. The second media file 304A may be received from a same or a different media source from which the first media file 108B may be received. However, the received second media file 304A may correspond to the received first media file 108B. In an example, a body camera (or any other image capturing device) of a police officer may record the first media file 108B (e.g., a video) of a crime scene. A prosecutor in a court of law may present the second media file 304A (e.g., a copy of the body camera video) during court trials. The second media file 304A may correspond to the video presented during the court trials and the media file recorded by the body camera may correspond to the first media file 108B.

At 306, an operation for second information determination may be executed. The circuitry 202 may be further configured to determine the second information 306A associated with the received second media file 304A, based on content of the received second media file 304A. The second information 306A may correspond to the first information 302A and may be determined for the received second media file 304A. For example, the second information 306A may include properties associated with the received second media file 304A. Parameters in the second information 306A may be different for different types of the received second media file 304A. For example, if the second media file 304A is a video, then the determined second information 306A may include one or more color values, and/or one or more audio values. The one or more color values may include pixel values for each line in one frame or set of frames of the received second media file 304A. Similarly, the one or more audio values may include information such as, amplitude, pitch, loudness, frequency, for audio content of the received second media file 304A. If the received second media file 304A is an audio, then the determined second information 306A may include only the one or more audio values. In case, the received second media file 304A is an image, then the determined second information 306A may include one or more color values of pixels of the image.

At 308, an operation for first information comparison may be executed. The circuitry 202 may be further configured to compare the first information 302A received from each of the plurality of databases 318 with one another. The first information 302A received from each of the plurality of databases 318 may be matched with one another to determine whether the values in first information 302A received from each of the plurality of databases 318 are the same. It may be noted that in some cases, one or more databases of the plurality of databases 318 may be compromised. In such a case, the values in the first information received from the compromised database(s) may not match with the values in the first information received from other databases of the plurality of databases 318.

At 310, an operation for first information verification may be executed. The circuitry 202 may be configured to verify the first information 302A. To verify the first information 302A, the circuitry 202 may determine the received first information 302A as unaltered, based on the comparison (executed at 308). As discussed, the first information 302A received from each of the plurality of databases 318 may be matched with one another. In case, the first information 302A received from each of the plurality of databases 318 match with one another, then each of the plurality of databases 318 may be determined to be uncompromised. In such case, the received first information 302A may be determined as unaltered and correct. In an example, the plurality of databases 318 may include a database-1, a database-2, a database-3, and a database-4, which may store various versions or copies of the first information 302A, such as, a version A, a version B, a version C, and a version D, respectively. The circuitry 202 may receive the various versions or copies of the first information 302A (including the versions A, B, C, and D) from the respective databases (e.g., the database-1, the database-2, the database-3, and the database-4) of the plurality of databases 318. The various versions of the first information 302A (i.e., the versions A, B, C, and D) may be compared with one another. In an example, based on the comparison, it may be determined that the versions A, B, and D may be the same, however, the values in the version C may not match with the corresponding values in the versions A, B, and D. In such case, the database-3 may be determined as compromised and the version C of the first information 302A (which may be received from the database-3) may be determined as altered and may be discarded. Thus, the circuitry 202 may use any of the versions A, B, or D as (unaltered and correct versions) of the received first information 302A, while the version C received from the database-3 may be determined as altered and may be discarded.

At 312, an operation for a comparison of the first information and the second information may be executed. The circuitry 202 may be configured to compare the received first information 302A and the determined second information 306A to determine whether the received first information 302A is same as the determined second information 306A or not. In an embodiment, the circuitry 202 may select an unaltered or correct version (from the various versions received from the plurality of databases 318) of the received first information 302A for further comparison with the determined second information 306A. The determination of a version of the received first information 302A as an unaltered or correct version is described further, for example, at 310.

For example, if each of the first media file 108B and the second media file 304A is a video or an image including one or more color values, then the circuitry 202 may compare each color value from the received first information 302A with a corresponding color value from the determined second information 306A to determine for a match of the color values. Similarly, if each of the first media file 108B and the second media file 304A is an audio including one or more audio values, then the circuitry 202 may compare each audio value from the received first information 302A with a corresponding audio value from the determined second information 306A to determine for a match of the audio values.

At 314, an operation for a second media file verification may be executed. The circuitry 202 may be configured verify the second media file 308A. To verify the second media file 308A, the circuitry 202 may determine the received second media file 304A as unaltered, based on the comparison of the received first information 302A and the determined second information 306A and based on the determination that the received first information 302A is unaltered. In case the received second media file 304A is unaltered, then the received first information 302A and the determined second information 306A may match with each other. In an example, a CCTV camera may record an accident. In such case, the first media file 108B may be a video recorded by the CCTV camera. The first information 302A of the first media file 108B may be determined and stored on each of the plurality of databases 318. During court trials, a persecutor may make slight alterations in the CCTV video and present altered CCTV video as the second media file 304A of the accident to a jury. The second information 306A of the presented second media file 304A may be determined, and jury may determine whether the presented second media file 304A is unaltered based on comparison of the received first information 302A with the determined second information 306A. As the second media file 304A is an altered version of the original CCTV video, the first information 302A may not match with the determined second information 306A. Hence, the jury may reject the second media file 304A (for example as a legitimate evidence), based on the determination that the second media file 304A is altered.

At 316, an operation for verification information rendering may be executed. The circuitry 202 may be configured to render verification information based on the determination that the received second media file 304A is unaltered. The verification information may indicate that the received second media file 304A is verified (i.e., determined as unaltered). In some cases, the verification information may indicate that the received second media file 304A is verified and is determined as altered, in case the received second media file is determined as altered. The verification information may be displayed on a display (such as, the display device 210 of FIG. 2). The verification information may be notified to the user (such as, the user 116 of FIG. 1) in a form of a notification displayed on the display (such as, the display device 210 of FIG. 2). In some cases, the verification may be notified to the user (such as, the user 116 of FIG. 1) in a form of a haptics feedback through the electronic device 102.

Typically, media files may be modified by a user using various computer applications or online tools. For example, the user 116 may remove certain portions of an original video and add or modify certain extra frames in the video that may not be present in the original video. In some cases, the media file may include information that may be critical for some purposes, such as, in case of legal proceedings or surveillance. Hence, an authenticity of the media file may need to be determined. The electronic device 102 may determine the received second media file 304A as unaltered (at 314), based on the comparison of the received first information 302A and the determined second information 306A and based on the determination that the received first information 302A is unaltered. The electronic device 102 may render the verification information based on the determination that the received second media file 304A is unaltered (at 316). As the first information 302A may be received from the plurality of databases 318 maintained by separate entities, in case values in the first information 302A are altered at one of the databases, the corresponding values in the first information 302A stored at the other databases may still be unaffected. The comparison between the first information 302A received from the various databases may be used to determine which of the databases may be compromised and may have altered the values in the first information 302A. Further, once the received first information 302A associated with the first media file 108B is determined (based on the comparison) as unaltered (at 310), the electronic device 102 may compare the received first information 302A with the determined second information 306A associated with the second media file 304A. The comparison between the first information 302A and the second information 306A may determine whether the source of the second media file 304A altered the second media file 304A or not. Thus, the authenticity and integrity of the second media file 304A with respect to an original media file (i.e., the first media file 108B) may be determined based on the two comparisons. Also, the electronic device 102 may determine which of the plurality of databases 318 may be compromised. Such databases may be blacklisted and not used further for storage of the first information 302A. In addition, the authenticity of the source of the second media file 304A may also be established based on the determination of the second media file 304A as unaltered. The source of the second media file 304A may be used for storage of media files in the future only if it is determined to be authentic.

Figure 4:
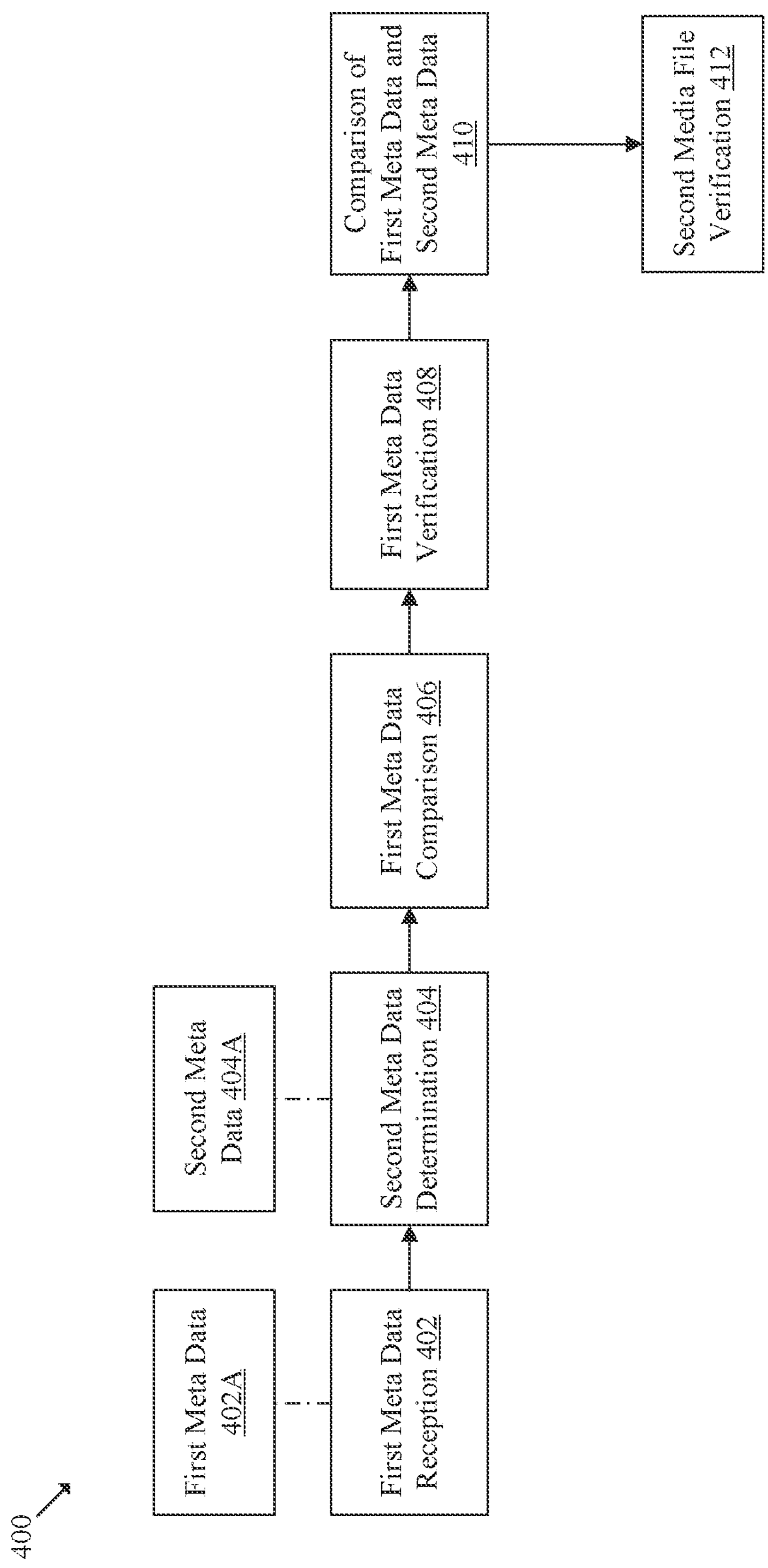
FIG. 4 is a diagram that illustrates an exemplary processing pipeline for implementation of media file verification using meta data, in accordance with an embodiment of the disclosure.

FIG. 4 is a diagram that illustrates an exemplary processing pipeline for implementation of media file verification using meta data, in accordance with an embodiment of the disclosure. FIG. 4 is explained in conjunction with elements from FIG. 1, FIG. 2, and FIG. 3. With reference to FIG. 4, there is shown an exemplary processing pipeline 400 that illustrates exemplary operations from 402 to 412 for implementation of media file verification using meta data. The exemplary operations 402 to 412 may be executed by any computing system, for example, by the electronic device 102 of FIG. 1 or by the circuitry 202 of FIG. 2. The exemplary processing pipeline 400 further illustrates first meta data 402A and second meta data 404A.

At 402, an operation for first meta data reception may be executed. The circuitry 202 may be configured to receive from each of the plurality of databases (such as, the plurality of databases 318), the first meta data 402A associated with the first media file 108B, wherein the first meta data 402A may correspond to the received first information (such as, the received first information 302A). It may be noted that the meta data may provide information about another data. The first meta data 402A may provide information of and point towards (e.g., based on a uniform resource locator) the first media file 108B. The first meta data 402A associated with the received first media file 108B may correspond to the received first information 302A. The first meta data 402A may be received from each of the plurality of databases 318. The circuitry 202 may request each of the plurality of databases 318 to transmit the first meta data 402A stored on each of the plurality of databases 318. Each of the plurality of databases 318 may verify the request and may provide the stored first meta data 402A to the electronic device 102. In an embodiment, the first information and the first meta data 402A may be received together from each of the plurality of databases 318. In another embodiment, the first information and the first meta data 402A may be received separately from each of the plurality of databases 318.

In an embodiment, the determined first meta data 402A associated with the received first media file may include at least one of: a time stamp, a start time, an end time, an identification associated with a media source, an individual login associated with the media source, or a number of data units of the first media file 108B. As discussed, the first meta data 402A may provide information related to the first media file 108B. The time stamp may be a time duration associated with a reception of the first media file 108B by the electronic device 102. The start time may be a time at which a reception of the first media file 108B may start from the media source or a storage device to the electronic device 102. The end time may be time at which a reception of the first media file 108B from the media source to the electronic device 102 ends. For example, if the electronic device 102 starts to receive a CCTV footage from a camera located within a bank at "12.10 hours" and stops to receive the CCTV footage from the camera at "16.20 hours". In such case, the start time may be "12.10 hours", the end time may be "16.20 hours", and the time stamp may be "12.10 hours" to "16.10 hours". The identification associated with the media source may be an identification (ID) number associated with the media source. It may be appreciated that each media source may have a unique ID, in order to identify the media source. The individual login associated with the media source may include login information that the media source may use to store the first information on each of the plurality of databases (such as, the plurality of databases 318 of FIG. 3). It may be noted that the plurality of databases 318 may store the first information (such as, the first information 302A of FIG. 3) associated with the first media file 108B received from only authorized media sources. Thus, in order to store the first information 302A associated with the first media file 108B, the media source may login to the plurality of databases 318 based on the login information associated with the media source. The number of data units of the first media file 108B may correspond to a size of the first media file 108B.

At 404, an operation for second meta data determination may be executed. The circuitry 202 may be configured to determine second meta data 404A associated with the received second media file (such as, the received second media file 304A of FIG. 3), based on the determined second information (such as, the second information 306A of FIG. 3). As discussed, once the electronic device 102 receives the second media file 304A, the circuitry 202 may determine the second information 306A. The circuitry 202 may further determine the second meta data 404A associated with the received second media file 304A. The determined second meta data 404A may provide information about the received second media file 304A. The determined second meta data 404A may include at least one of: the time stamp, the start time, the end time, the identification associated with the media source, the individual login associated with the media source, or the number of data units of the received second media file 304A. The second meta data 404A may correspond to the first meta data 402A. Details related to the first meta data are described further, for example, at 402.

At 406, an operation for first meta data comparison may be executed. The circuitry 202 may be configured to compare the first meta data 402A received from each of the plurality of databases (such as, the plurality of databases 318 of FIG. 3) with one another. It may be noted that in certain cases, the first meta data 402A stored in one or more databases of the plurality of databases 318 may be compromised or altered. However, as each of the plurality of databases 318 may be independent of each other and may not communicate with each other, it may be unlikely that each of the plurality of databases may be compromised at once. Therefore, the first meta data 402A received from each of the plurality of databases 318 may be compared with one another to determine whether any of the database is compromised or not. The first meta data 402A received from databases that are not compromised may match with one another.

At 408, an operation for first meta data verification may be executed. The circuitry 202 may be configured to verify the first meta data 402A. To verify the first meta data 402A, the circuitry 202 may determine the first meta data 402A as unaltered, based on the comparison of the first meta data 402A received from each of the plurality of databases (such as, the plurality of databases 318 of FIG. 3). As discussed, the first meta data 402A received from each of the plurality of databases 318 may be compared with one another to determine whether any of the database is compromised or not. The first meta data 402A received from each of the plurality of databases that are not compromised may match with one another. For example, the plurality of databases may include a database-1, a database-2, and a database-3. The first meta data 402A received from the database-1 and the database-2 may match. However, the first meta data 402A received from the database-3 may not match with the database-1 and the database-2. Hence, it may be determined the first meta data 402A received from the database-3 may be altered and the first meta data received from the database-1 and the database-2 may be unaltered.

At 410, an operation for a comparison of the first meta data and the second meta data may be executed. The circuitry 202 may be configured to compare the received first meta data 402A and the determined second meta data 404A. The first meta data 402A may be compared with the determined second meta data 404A to determine whether the first meta data 402A matches the second meta data 404A or not.

At 412, an operation for second media file verification may be executed. The circuitry 202 may be configured to verify the second media file 304A. To verify the second media file 304A, the circuitry 202 may determine the received second media file 304A as unaltered, based on the comparison of the received first meta data 402A and the determined second meta data 404A and based on the determination that the first meta data 402A is unaltered. In case the received first meta data 402A is verified to be unaltered and matches with the determined second meta data 404A, then the received second media file 304A may be unaltered and same as the first media file 108B. However, if the first meta data 402A does not match the determined second meta data 404A, then the received second media file 304A may have been compromised or altered. In an example, the first media file 108B may be an audio recording of an argument between two persons recorded by the media source from a start time "13:05 hours" to an end time "13:30 hours". However, an audio recording (e.g., the second media file 304A) presented in court of law may be from a start time "13:20 hours" to an end time "13:40 hours". In such a case, the determined second meta data 404A of the second media file 304A may include the start time as "13:20 hours" and the end time as "13:40 hours". Further, the received first meta data 402A may include the start time as "13:05 hours" and the end time as "13:30 hours". As, the received first meta data 402A and the determined second meta data 404A do not match, the circuitry 202 may determine that the second media file 304A may have been altered. Thus, the court of law may reject the second media file 304A as evidence. It may be noted that along with the comparison of the received first meta data 402A and the determined second meta data 404A, the comparison of the received first information 302A with the second information 306A may be also necessary to determine that the received second media file 304A is unaltered.

Figure 5:
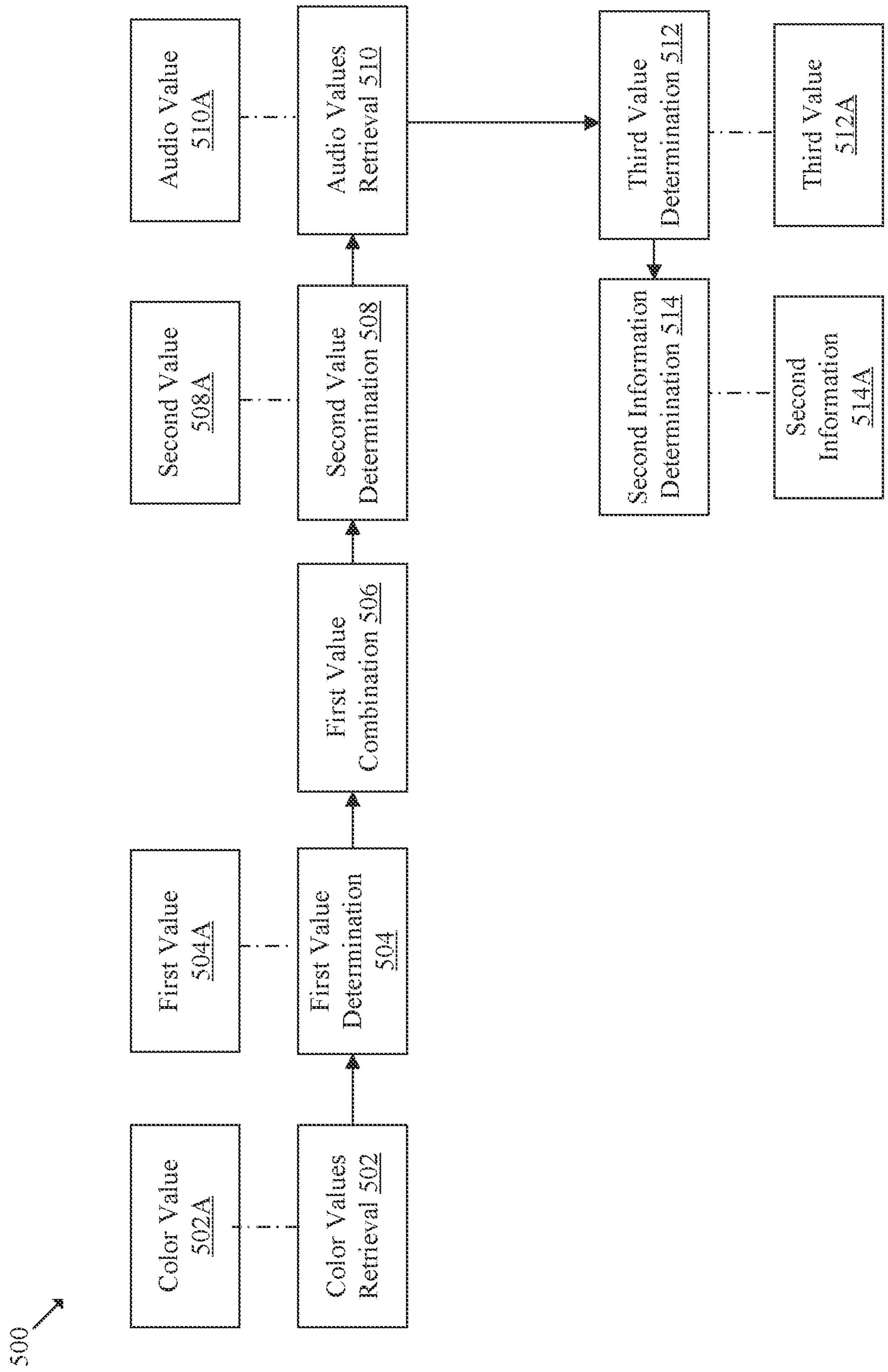
FIG. 5 is a diagram that illustrates an exemplary processing pipeline for implementation of media file verification for videos, in accordance with an embodiment of the disclosure.

FIG. 5 is a diagram that illustrates an exemplary processing pipeline for implementation of media file verification for videos, in accordance with an embodiment of the disclosure. FIG. 5 is explained in conjunction with elements from FIG. 1, FIG. 2, FIG. 3, and FIG. 4. With reference to FIG. 5, there is shown an exemplary processing pipeline 500 that illustrates exemplary operations from 502 to 514 for implementation of media file verification for videos. The exemplary operations 502 to 514 may be executed by any computing system, for example, by the electronic device 102 of FIG. 1 or by the circuitry 202 of FIG. 2. The exemplary processing pipeline 500 further illustrates color value 502A, a first value 504A, a second value 508A, an audio value 510A, a third value 512A, and second information 514A.

In an embodiment, the received first media file 108B and the received second media file 110B may correspond to at least one of a pre-recorded video or a live video. The pre-recorded video may be recorded before the first media file 108B and the received second media file 110B are received by the electronic device 102. For example, the pre-recorded video may be a pre-dated CCTV footage, a pre-recorded movie, and the like.

The live video may be recorded at the time (for example, in real-time) when the first media file 108B and the received second media file 110B are received by the electronic device 102. For example, the live video may be a live CCTV footage of a bank (or of any particular place or event). The live CCTV footage may be captured by a CCTV camera of the bank and sent to the electronic device 102. Thus, the process of determination of the second media file 110B as unaltered may occur while the second media file 110B is recorded (provided internet access is possible through a cell tower or a secure mobile hotspot to transmit a live media file such as, the live video to the electronic device 102).

At 502, an operation for color values retrieval may be executed. The circuitry 202 may be configured to retrieve one or more color values (such as, the color value 502A) of each row in a frame of a plurality of frames associated with the received second media file 110B. An example of a row in a frame associated with the second media file 110B is provided, for example, in FIG. 8. In an example, the one or more color values may belong to a range from "0" to "255", where "0" may represent a minimum light intensity (such as, a black color) and "255" may represent a maximum light intensity (such as, a white color). Each color value may include a red component, a green component, and a blue component. For example, a color value may include "100" as the red component, "150" as the green component, and "0" as the blue component. It may be appreciated that the frame may be a picture in the video and the video may include a plurality of such frames. The circuitry 202 may select the frame from the plurality of frames and may retrieve one or more color values (such as, the color value 502A) from each row of the frame. The one or more color values may or may not be equal to the number of pixels in the row. For example, the circuitry 202 may retrieve only 100 color values from a total of 200 pixels in each row of the frame. Alternatively, the circuitry 202 may retrieve color values from each pixel of the frame.

At 504, an operation for first value determination may be executed. The circuitry 202 may be configured to determine the first value 504A for each row in the frame of the received second media file 1101B, based on the retrieved one or more color values. The first value 504A may represent the retrieved one or more color values as a numeric value. For example, the first value 504A may correspond to a conversion of one or more color values from arbitrary size numeric values to a fixed size numeric value. For example, one or more color values may include hundred color values such as, a first Red-Green-Blue (RGB) color value of "(100, 10, 180)", a second RGB color value of "(100, 50, 200)", and, a third RGB value of "(10, 40, 180)", and the like. In an embodiment, the first value 504A may be determined for one or more color values of each row based on a hash algorithm that may convert one or more color values to a string of binary "0" and "1" of a predefined number of bits (e.g., sixteen bits). Alternatively, the first value 504A may be determined for one or more color values of each row based on a summation, an XOR, or an average of one or more color values. The operations 502 and 504 may be repeated for each row in each frame of the plurality of frames. Thus, the first value 504A may be determined for one or more color values for each row in each frame of the plurality of frames of the video corresponding to the second media file 110B.

At 506, an operation for first value combination may be executed. The circuitry 202 may be configured to combine the determined first value 504A for a predefined set of frames of the plurality of frames associated with the received second media file 110B. The predefined set of frames may be a subset of the plurality of frames whose determined first value (i.e., the first value 504A) may be needed to be combined. As the plurality of frames may include a number of frames such as, 10,000 frames, a combination of the determined first value 504A for the predefined set of frames (e.g., 10 frames) may lead to loss of data. Once, the first value 504A for each row of each frame of the predefined set of frames is determined, the determined first value 504A may be combined for the predefined set of frames. For example, for every 10 frames (i.e., the predefined set of frames), the first value 504A per row per frame of the set of 10 frames may be combined based on an XOR, a summation, a difference, or an average of the first value 504A for each row of each frame of the set of 10 frames.

At 508, an operation for second value determination may be executed. The circuitry 202 may be configured to determine the second value 508A based on the combination of the determined first value 504A for the predefined set of frames of the plurality of frames. The second value 508A may be an aggregated value for the predefined set of frames and may be determined based on the combination of the determined first value 504A for the predefined set of frames of the plurality of frames. For example, for every 20 frames, the first values per row per frame of the 20 frames may be combined based on a summation of the determined first value 504A of each frame to determine the second value 508A. It may be noted that the steps 506 and 508 may be optional and may be executed only when gross or aggregate verification of the color values in the frames is needed. In other words, instead of a verification of a color value of each pixel value per frame, the circuitry 202 may compare the determined second value 508A for the predefined set of frames. However, the accuracy of the second media file verification (i.e., the determination of whether the second media file 110B is unaltered) may reduce when the determined second value 508A is used for comparison operations (e.g., at 308 or 312 of FIG. 3). For better accuracy of the second media file verification, the determined first value 504A for each frame of the predefined set of frames may not be combined, however, the determined first value 504A for each pixel of the frame may be used for comparison operations (e.g., at 308 or 312 of FIG. 3).

At 510, an operation for audio values retrieval may be executed. The circuitry 202 may be further configured to retrieve one or more audio values for the plurality of frames associated with received second media file 110B (i.e., pre-recorded video or a live video). Herein, the one or more audio values such as, the audio value 510A, may correspond to information including an intensity, an amplitude, a pitch, a frequency, and the like, of audio for the plurality of frames associated with received second media file 110B. As, the received second media file 110B may be a video, the second media file 110B may include both an audio component and a video component. The audio component across the plurality of frames or across the second media file 110B may be analyzed to determine the one or more audio values. In an example, the one or more audio values over the plurality of frames associated with received second media file 110B may have an intensity of 25 dB and a frequency of 180 Hz.

At 512, an operation for third value determination may be executed. The circuitry 202 may be further configured to determine the third value 512A, based on the retrieved one or more audio values. The third value 512A may be represented as a numeric value that may be determined based on an application of a transformation function (e.g., a hash function) on the retrieved one or more audio values. In an example, the one or more audio values over the plurality of frames associated with received second media file 110B may correspond to an intensity of 15 dB and a frequency 150 Hz. The circuitry 202 may apply an algorithm (e.g., based on the transformation function) to convert the one or more audio values to the third value 512A, which may be a numeric, character, or alpha-numeric string of bits (like 128 bits). It may be noted that the technique for determining the first value 504A and the third value 512A may or may not differ. Further, the third value 512A may be determined over a different number of frames as compared to the second value 508A.

At 514, an operation for second information determination may be executed. The circuitry 202 may be further configured to determine the second information 514A (associated with the received second media file 1101B), based on the determined second value 508A and the determined third value 512A. In an embodiment, the determined second value 508A and the determined third value 512A may be combined. For example, the determined third value 501A may be added (for example, based on a weighted summation or weighted average) to the determined second value 508A in order to determine the second information 514A. Thus, the second information 514A may include values associated with both the audio component and the video component of the received second media file 110B. It may be noted that the second information 514A may be determined from a single frame of the video or from the plurality of frames including several frames. Herein, the determined second information 514A may be tagged as a part of the plurality of frames.

Figure 6:
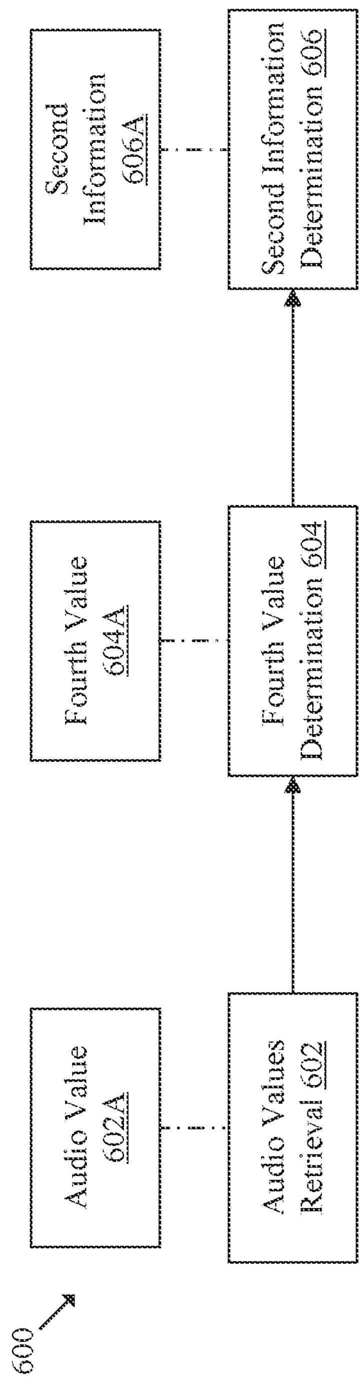
FIG. 6 is a diagram that illustrates an exemplary processing pipeline for implementation of media file verification for audios, in accordance with an embodiment of the disclosure.

FIG. 6 is a diagram that illustrates an exemplary processing pipeline for implementation of media file verification for audios, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary processing pipeline 600 that illustrates exemplary operations from 602 to 606 for implementation of media file verification for audios. The exemplary operations 602 to 606 may be executed by any computing system, for example, by the electronic device 102 of FIG. 1 or by the circuitry 202 of FIG. 2. The exemplary processing pipeline 600 further illustrates an audio value 602A, a fourth value 604A, and second information 606A.

In an embodiment, the first media file 108B and the received second media file 110B may correspond to at least one of a pre-recorded audio or a live audio. The pre-recorded audio may be an audio that may be recorded before the second media file 110B is received by the electronic device 102. For example, the pre-recorded audio may an audio of conversations between a group of people and may be recorded by an audio source at a time instant 'X'. After the audio is recorded, the electronic device 102 may receive the pre-recorded audio from the audio source at a time instant after the time instant 'X'. The live audio may be an audio that may be received at a time of its occurrence. For example, a microphone may be positioned in an area and conversations between people in the area may be sent to the electronic device 102, in real-time.

At 602, an operation for audio values retrieval may be executed. The circuitry 202 may be further configured to retrieve one or more audio values such as, the audio value 602A, for the plurality of frames associated with received second media file 110B. It may be appreciated that the frames in the audio may be information related to the audio at a particular instant of time. The plurality of frames may be frames included in the received second media file 110B. The audio for the plurality of frames may be analyzed to retrieve the one or more audio values. As discussed in FIG. 5 (at 510), the one or more audio values may include information related to the pitch, the intensity, loudness, and the frequency, and the like, of the received second media file 110B. In an example, the one or more audio values over a first frame and a second frame associated with received second media file 110B may be an intensity of 25 dB and a frequency of 180 Hz, and an intensity of 15 dB and a frequency of 150 HZ, respectively. The audio value retrieval operation is described further, for example, in FIG. 5 (at 510).

At 604, an operation for fourth value determination may be executed. The circuitry 202 may be further configured to determine the fourth value 604A based on the retrieved one or more audio values. The fourth value 604A may represent the retrieved one or more audio values in a numeric value. For example, the one or more audio values may include hundred audio values of a first intensity and frequency of 15 dB and 200 Hz, a second intensity and frequency of 30 dB and 150 HZ, and the like. The circuitry 202 may apply an algorithm (e.g., based on a transformation function, such as, a hash function) to convert the one or more audio values to the fourth value 604A, which may be a numeric, character, or alpha-numeric string of 128 bits. The determination of the fourth value 604A may be similar to the determination of the third value 512A. Details related to the determination of the third value 512A are provided, for example, in FIG. 5 (at 512).

At 606, an operation for second information determination may be executed. The circuitry 202 may be further configured to determine the second information 606A associated with the received second media file 1101B, based on the determined fourth value 604A. In an example, the fourth value 604A may be determined for each of the plurality of frames and may be combined to determine the second information 606A. For example, the determined fourth value 604A may correspond to a weighted summation or weighted average of the one or more audio values of the plurality of frames associated with the second media file 110B. Thus, the second information 514A may include values of an audio component of the second media file 1101B, which may correspond to a pre-recorded audio or a live audio.

Figure 7:
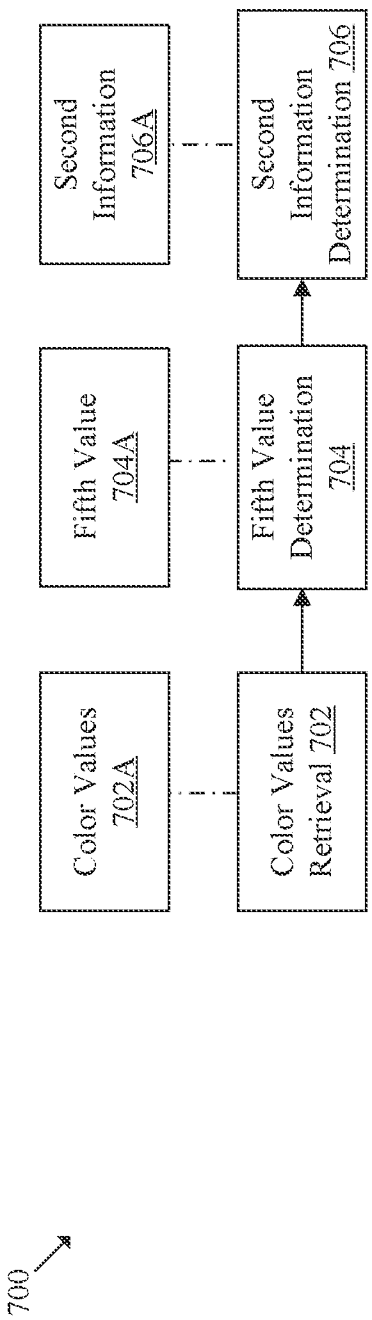
FIG. 7 is a diagram that illustrates an exemplary processing pipeline for implementation of media file verification for images, in accordance with an embodiment of the disclosure.

FIG. 7 is a diagram that illustrates an exemplary processing pipeline for implementation of media file verification for images, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary processing pipeline 700 that illustrates exemplary operations from 702 to 706 for implementation of media file verification for images. The exemplary operations 702 to 706 may be executed by any computing system, for example, by the electronic device 102 of FIG. 1 or by the circuitry 202 of FIG. 2. The exemplary processing pipeline 700 further illustrates a color value 702A, a fifth value 704A, and second information 706A.

In an embodiment, each of the first media file 108B and the received second media file 110B may be an image. An authenticity of images may need to be verified in certain cases. In example, a policeman may capture an image of a crime scene. The captured image may be the first media file 108B. A prosecution or defense lawyer may submit an image (e.g., the second media file 1101B) in a court of law as an evidence. The submitted second media file 110B may be needed to be determined for authenticity based on the capture image (i.e., the first media file 108B).

At 702, an operation for color values retrieval may be executed. The circuitry 202 may be configured to retrieve one or more color values such as, the color value 702A, for each row in the received second media file 110B. Each row may correspond to a set of pixels in the received second media file 110B. An example of a row in the image associated with the second media file 110B is provided, for example, in FIG. 8. As discussed, the color value may be values of each component of color in the pixel. In an example, the color value of a first pixel in a first row of the received second media file may be an RGB value "(100, 150, 0)". Each row of the received second media file 110B may be analyzed to retrieve one or more color values. In an embodiment, the color value for each pixel of the received second media file 110B may be determined. In another embodiment, an average of the color values of the set of pixels in each row may be determined. Details related to the retrieval of one or more color values are provided, for example, at 502, in FIG. 5.

At 704, an operation for fifth value determination may be executed. The circuitry 202 may be further configured to determine the fifth value 704A for each row in the received second media file 1101B, based on the retrieved one or more color values. The fifth value 704A may represent the retrieved one or more color values as a numeric value. For example, one or more color values may include hundred color values, such as, a first Red-Green-Blue (RGB) color value of "(100, 10, 180)", a second RGB color value of "(100, 50, 200)", and, a third RGB value of "(10, 40, 180)", and the like. In an embodiment, the fifth value 704A may be determined for one or more color values of each row based on a hash algorithm that may convert one or more color values to a string of binary "0" and "1" of a predefined number of bits (e.g., sixteen bits). Alternatively, the fifth value 704A may be determined for one or more color values of each row based on a summation, an XOR, or an average of one or more color values. Techniques related to the determination of the fifth value 704A may be similar to the determination of the first value 504A, as described, for example, in FIG. 5 (at 504).

At 706, an operation for second information determination may be executed. The circuitry 202 may be further configured to determine the second information 706A associated with the received second media file 1101B, based on the determined fifth value 704A. In an embodiment, the fifth value 704A for each of the pixel in the received second media file 110B may be determined. The second information 706A may include the determined fifth value 704A for each of the pixel in the received second media file 110B. In another embodiment, the fifth value 704A for each pixel in each row may be determined, and the second information 706A may be determined based on an average or summation of the fifth value 704A determined for each pixel in each row.

Figure 8:
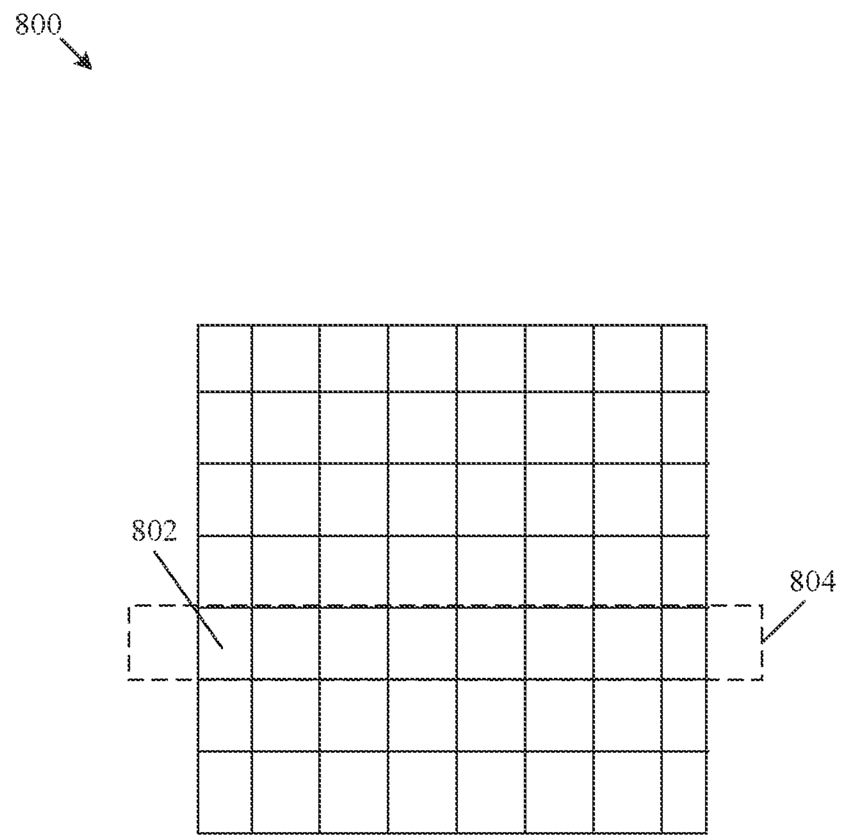
FIG. 8 is a diagram that illustrates an exemplary video frame, in accordance with an embodiment of the disclosure.

FIG. 8 is a diagram that illustrates an exemplary video frame, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown an exemplary video frame 800. The video frame (or the image) 800 includes a set of pixels 802 and a row 804. The video frame 800 may be similar to a frame of the plurality of frames of a media file (such as, the first media file 108B or the second media file 1101B), which may correspond to a pre-recorded or live video. In an embodiment, in case the media file (such as, the first media file 108B or the second media file 1101B) corresponds to an image, the video frame 800 may be the image.

In an embodiment, the circuitry 202 may retrieve one or more color values (e.g., the color value 502A) of each row in the video frame 800 of the plurality of frames associated with the received first media file 108B. The retrieval of one or more color from the plurality of frames of the received first media file 108B is described, for example, in FIG. 5 (at 502). For example, the circuitry 202 may retrieve one or more color values of the row 804 based on pixels values of each pixel such as, the pixel 802, of the row 804. Similarly, in case the video frame 800 is an image, the circuitry 202 may retrieve one or more color values of each row (e.g., the row 804) based on a set of pixels (e.g., the pixel 802) in the row of the image.

It should be noted that the video frame 800 (or the image) is for exemplary purposes and should not be construed to limit the scope of the disclosure.

Figure 9:
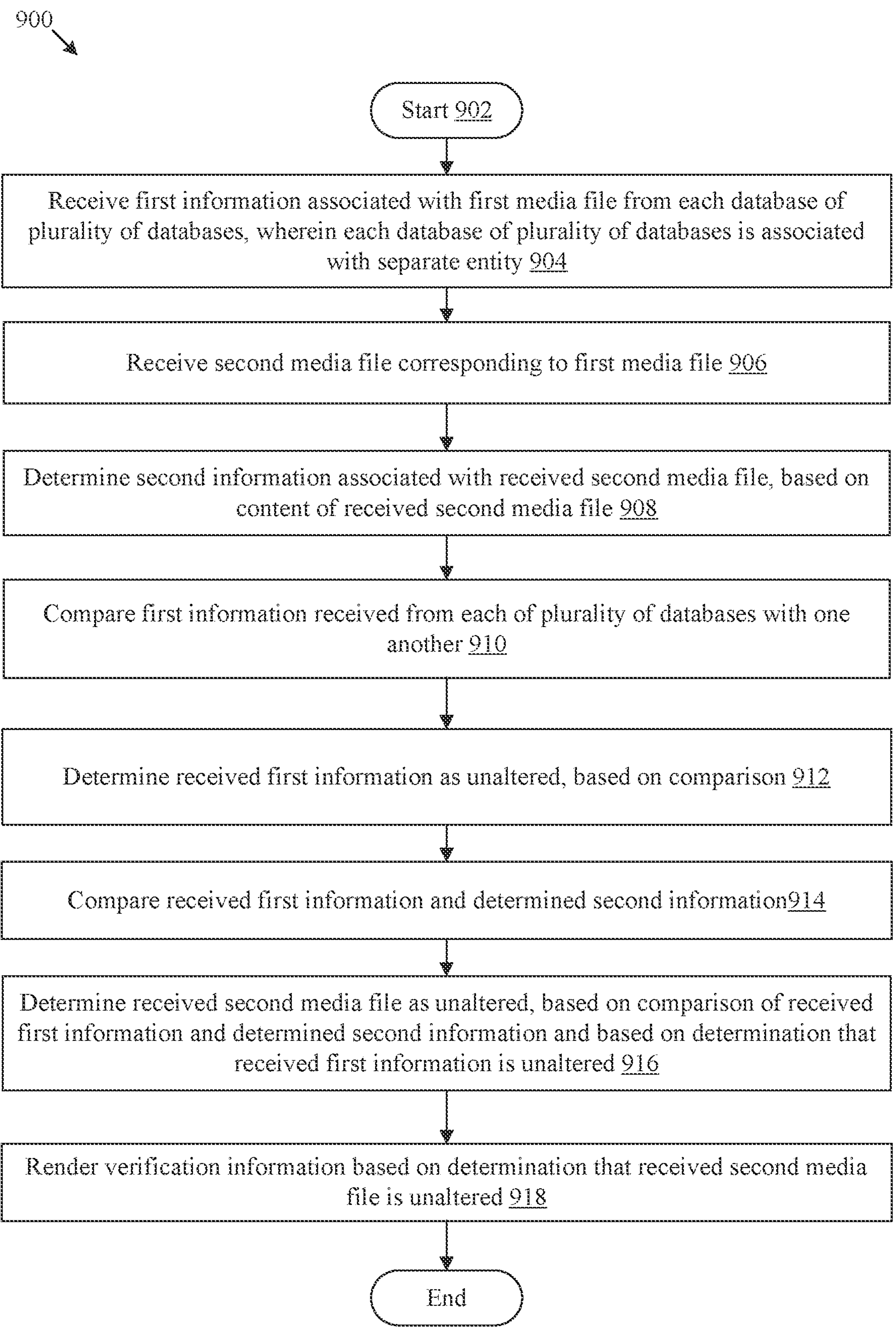
FIG. 9 is a flowchart that illustrates operations of an exemplary method for implementation of media file verification, in accordance with an embodiment of the disclosure.

FIG. 9 is a flowchart that illustrates operations of an exemplary method for implementation of media file verification, in accordance with an embodiment of the disclosure. FIG. 9 is described in conjunction with elements from FIG. 1, FIG. 2, FIG. 3, FIG. 4, FIG. 6, FIG. 7, and FIG. 8. With reference to FIG. 9, there is shown a flowchart 900. The flowchart 900 may include operations from 902 to 918 and may be implemented by the electronic device 102 of FIG. 1 or by the circuitry 202 of FIG. 2. The flowchart 900 may start at 902 and proceed to 904.

At 904, the first information associated with the first media file may be received from each database of a plurality of databases, wherein each database of the plurality of databases may be associated with a separate entity. The circuitry 202 may be configured to receive the first information (such as, the first information 302A of FIG. 3) associated with the first media file (e.g., the first media file 108B) from each database of the plurality of databases (such as, the plurality of databases 318 of FIG. 3). Each database of the plurality of databases may be associated with the separate entity. The first media file 108B may correspond to an image, an audio, or a video. For example, the first media file may an image of a crime scene, an audio of conversations between police officers, or a video recording of a robbery. The first information may include information related to properties of the received first media file such as, color values, audio amplitude, audio frequency, audio pitch, and the like. The first value may be received from each of the plurality of databases. The plurality of databases may be third party storage devices that may store the first information. As, each of the plurality of database may not communicate with each other, even if one of the databases is compromised (which may lead to an alteration of the first information stored on the database), the other databases of the plurality of database may remain unaffected. Thus, the first information stored on other databases of the plurality of database may remain unaltered. Details related to the receipt of the first information are provided, for example, in FIG. 3 (at 302).

At 906, the second media file corresponding to the first media file may be received. The circuitry 202 may be further configured to receive the second media file (such as, the second media file 304A of FIG. 3) corresponding to the first media file 108B. The received second media file 304A may be the media file that needs to be verified to determine whether it matches with the first media file 108B or not. The second media file 304A may be also a video, an image, or an audio. Details related to the second media file reception are further provided, for example, in FIG. 3 (at 304).

At 908, the second information associated with the received second media file (such as, the received second media file 304A of FIG. 3) may be determined based on the content of the received second media file 304A. The circuitry 202 may be further configured to determine the second information associated with the received second media file 304A, based on the content of the received second media file 304A. The second information may be similar to the first information and may be associated with certain properties of the received second media file 304A. For example, the second information may be color values, amplitude, frequency, pitch, loudness, and the like. Details related to the second information determination are further provided, for example, in FIG. 3 (at 306).

At 910, the first information received from each of the plurality of databases may be compared with one another. The circuitry 202 may be further configured to compare the first information (such as, the first information 302A of FIG. 3) received from each of the plurality of databases (such as, the plurality of databases 318 of FIG. 3) with one another. The first information received from each of the plurality of databases may be matched with one another to determine whether the first information received from each of the plurality of databases are same. In case the first information received from any of the database of the plurality of databases does not match with the first information received from other databases (of the plurality of databases) then the corresponding database may be compromised. Hence, the first information received from the compromised database may be ignored. Details related to the comparison of the first information are further provided, for example, in FIG. 3 (at 308).

At 912, the received first information may be determined as unaltered, based on the comparison. The circuitry 202 may be further configured to determine the received first information (such as, the first information 302A of FIG. 3) as unaltered, based on the comparison. As discussed, the first information received from each of the plurality of databases may be compared with one another. In case, the first information received from each of the plurality of databases matches with one another, then the received first information may be determined as unaltered. Details related to the determination of the first information as unaltered are further provided, for example, in FIG. 3 (at 310).

At 914, the received first information and the determined second information may be compared. The circuitry 202 may be further configured to compare the received first information (such as, the received first information 302A of FIG. 3) and the determined second information (such as, the determined second information 306A of FIG. 3). The received first information and the determined second information may be compared to determine whether they are same or not. For example, each audio value and color value of the received first information may be compared with the corresponding audio value and the corresponding color value of the determined second information. Details related to the comparison of the received first information and the determined second information are provided, for example, in FIG. 3 (at 312).

At 916, the received second media file may be determined as unaltered, based on the comparison of the received first information and the determined second information and based on the determination that the received first information is unaltered. The circuitry 202 may be further configured to determine the received second media file (such as, the received second media file 304A of FIG. 3) as unaltered, based on the comparison of the received first information (such as, the received first information 302A of FIG. 3) and the determined second information (such as, the determined second information 306A of FIG. 3) and based on the determination that the received first information is unaltered. In case, the received second media file is unaltered, then the received first information and the determined second information may match with each other else the received first information and the determined second information may not match with each other. In an example, the one or more audio values in the received first information when compared with the one or more audio values in the determined second information may be determined as dissimilar. Hence, the received second media file may be determined as altered.

Details related to the determination of the received second media file as altered are further provided, for example, in FIG. 3 (at 314).

At 918, the verification information may be rendered based on the determination that the received second media file is unaltered. The circuitry 202 may be configured to render the verification information based on the determination that the received second media file (such as, the second media file 304A of FIG. 3) is unaltered. The verification information may indicate whether the received second media file is determined as unaltered. The verification information may be displayed on the display (such as, the display device 210 of FIG. 2). The verification information may be notified to the user (such as, the user 116 of FIG. 1) in the form of a notification displayed on the display (such as, the display device 210 of FIG. 2). In some cases, the verification information may be notified to the user in the form of a haptics feedback. Control may pass to end.

Although the flowchart 900 is illustrated as discrete operations, such as, 904, 906, 909, 910, 912, 914, 916, and 918 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include receipt of a first information (such as, the first information 302A of FIG. 3) associated with a first media file (e.g., the first media file 108B) from each database of a plurality of databases (such as, the plurality of databases 318 of FIG. 3). Herein, each database of the plurality of databases 318 may be associated with a separate entity. The operations may further include receipt of a second media file (such as, the second media file 304A of FIG. 3) corresponding to the first media file 108B. The operations may further include determination of second information (such as, the second information 306A of FIG. 3) associated with the received second media file (such as, the received second media file 304A of FIG. 3), based on the content of the received second media file 304A. The operations may further include comparison of the first information (such as, the first information 302A of FIG. 3) received from each of the plurality of databases (such as, the plurality of databases 318 of FIG. 3) with one another. The operations may further include determination of the received first information (such as, the first information 302A of FIG. 3) as unaltered, based on the comparison. The operations may further include comparison of the received first information (such as, the received first information 302A of FIG. 3) and the determined second information (such as, the determined second information 306A of FIG. 3). The operation may further include determination of the received second media file (such as, the received second media file 304A of FIG. 3) as unaltered, based on the comparison of the received first information (such as, the received first information 302A of FIG. 3) and the determined second information (such as, the determined second information 306A of FIG. 3) and based on the determination that the received first information is unaltered. The operation may further include rendering verification information based on the determination that the received second media file (such as, the second media file 304A of FIG. 3) is unaltered.

Exemplary aspects of the disclosure may provide an electronic device (such as, the electronic device 102 of FIG. 1) that includes circuitry (such as, the circuitry 202). The circuitry 202 may be configured to receive a first information (such as, the first information 302A of FIG. 3) associated with a first media file (e.g., the first media file 108B) from each database of a plurality of databases (such as, the plurality of databases 318 of FIG. 3). Herein, each database of the plurality of databases 318 may be associated with a separate entity. The circuitry 202 may be configured to receive a second media file (such as, the second media file 304A of FIG. 3) corresponding to the first media file 108B. The circuitry 202 may be configured to determine second information (such as, the second information 306A of FIG. 3) associated with the received second media file (such as, the received second media file 304A of FIG. 3), based on the content of the received second media file. The circuitry 202 may be configured to compare the first information (such as, the first information 302A of FIG. 3) received from each of the plurality of databases (such as, the plurality of databases 318 of FIG. 3) with one another. The circuitry 202 may be configured to determine the received first information (such as, the first information 302A of FIG. 3) as unaltered, based on the comparison. The circuitry 202 may be configured to compare the received first information (such as, the received first information 302A of FIG. 3) and the determined second information (such as, the determined second information 306A of FIG. 3). The circuitry 202 may be configured to determine the received second media file (such as, the received second media file 304A of FIG. 3) as unaltered, based on the comparison of the received first information (such as, the received first information 302A of FIG. 3) and the determined second information (such as, the determined second information 306A of FIG. 3) and based on the determination that the received first information is unaltered. The circuitry 202 may be configured to render verification information based on the determination that the received second media file (such as, the second media file 304A of FIG. 3) is unaltered.

In an embodiment, each database of the plurality of databases 318 may correspond to a node of a distributed ledger.

In an embodiment, the circuitry 202 may be further configured to receive, from each of the plurality of databases, first meta data associated with the first media file 108B, wherein the first meta data corresponds to the received first information. The circuitry 202 may further determine second meta data associated with the received second media file 304A, based on the determined second information. The circuitry 202 may further compare the first meta data received from each of the plurality of databases 318 with one another. The circuitry 202 may further determine the first meta data as unaltered, based on the comparison of the first meta data received from each of the plurality of databases 318. The circuitry 202 may further compare the received first meta data and the determined second meta data. The circuitry 202 may further determine the received second media file as unaltered, based on the comparison of the received first meta data and the determined second meta data and based on the determination that the first meta data is unaltered.

In an embodiment, received first meta data associated with the first media file may include at least one of a time stamp, a start time, an end time, an identification associated with a media source, an individual login associated with the media source, or a number of data units of the first media file 108B.

In an embodiment, each of the first media file 108B and the received second media file 110B may correspond to at least one of a pre-recorded video or a live video. In an embodiment, the circuitry 202 may further retrieve one or more color values of each row in a frame of a plurality of frames associated with the received second media file 304A. The circuitry 202 may further determine a first value for each row in the frame of the received second media file 304A, based on the retrieved one or more color values. The circuitry 202 may further combine the determined first value for a predefined set of frames of the plurality of frames associated with the received second media file 304A. The circuitry 202 may further determine a second value based on the combination of the determined first value for each of the predefined set of frames of the plurality of frames.

In an embodiment, the circuitry 202 may further retrieve one or more audio values for the plurality of frames associated with received second media file 304A. The circuitry 202 may further determine a third value, based on the retrieved one or more audio values. The circuitry 202 may further determine the second information associated with the received second media file, based on the determined second value and the determined third value.

In an embodiment, each of the first media file 108B and the received second media file 110B may correspond to at least one of a pre-recorded audio or a live audio. In an embodiment, the circuitry 202 may further retrieve one or more audio values for a plurality of frames associated with received second media file 304A. The circuitry 202 may further determine a fourth value based on the retrieved one or more audio values. The circuitry 202 may further determine the second information associated with the received second media file 304A, based on the determined fourth value.

In an embodiment, each of the first media file 108B and the received second media file 110B may be an image. In an embodiment, the circuitry 202 may further retrieve one or more color values for each row in the received second media file. Each row may correspond to a set of pixels in the received second media file 304A. The circuitry 202 may further determine a fifth value for each row in the received second media file 304A, based on the retrieved one or more color values. The circuitry 202 may further determine the second information associated with the received second media file 304A, based on the determined fifth value set.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
a display device; and
circuitry configured to:
transmit a request signal to each database of a plurality of databases, wherein
the request signal is associated with first information,
the first information is associated with a first media file, and
each database of the plurality of databases authenticates the request signal;
receive the first information from each database of the plurality of databases based on the authentication of the request signal;
receive a second media file that corresponds to the first media file;
determine, based on content of the received second media file, second information associated with the received second media file;
compare the first information received from each database of the plurality of databases;
determine the received first information as unaltered, based on the comparison of the first information received from each database of the plurality of databases;
compare the received first information and the determined second information;
determine the received second media file as unaltered, based on
the comparison of the received first information and the determined second information, and
the determination that the received first information is unaltered; and
transmit, to the display device, verification information based on the determination that the received second media file is unaltered.

2. The electronic device according to claim 1, wherein each database of the plurality of databases corresponds to a node of a distributed ledger.

3. The electronic device according to claim 1, wherein the circuitry is further configured to:
receive, from each database of the plurality of databases, first meta data associated with the first media file,
wherein the first meta data corresponds to the received first information;
determine second meta data based on the determined second information, wherein the second meta data is associated with the received second media file;
compare the first meta data received from each database of the plurality of databases;
determine the first meta data as unaltered, based on the comparison of the first meta data received from each database of the plurality of databases;
compare the received first meta data and the determined second meta data; and
determine, the received second media file as unaltered, based on
the comparison of the received first meta data and the determined second meta data, and
the determination that the first meta data is unaltered.

4. The electronic device according to claim 3, wherein the received first meta data includes at least one of a time stamp, a start time, an end time, an identification associated with a media source, an individual login associated with the media source, or a number of data units of the first media file.

5. The electronic device according to claim 1, wherein each of the first media file and the received second media file corresponds to at least one of a pre-recorded video or a live video.

6. The electronic device according to claim 5, wherein the circuitry is further configured to:

retrieve at least one color value of each row in a frame of a plurality of frames, wherein the plurality of frames is associated with the received second media file;

determine, based on the retrieved at least one color value, a first value for each row in the frame of the plurality of frames;

combine the determined first value for a specific set of frames of the plurality of frames; and determine a second value based on the combination.

7. The electronic device according to claim 6, wherein the circuitry is further configured to:

retrieve at least one audio value for the plurality of frames;

determine a third value based on the retrieved at least one audio value; and determine the second information based on the determined second value and the determined third value.

8. The electronic device according to claim 1, wherein each of the first media file and the received second media file corresponds to at least one of a pre-recorded audio or a live audio.

9. The electronic device according to claim 8, wherein the circuitry is further configured to:

retrieve at least one audio value for a plurality of frames, wherein the plurality of frames is associated with received second media file;

determine a fourth value based on the retrieved at least one audio value; and determine the second information based on the determined fourth value.

10. The electronic device according to claim 1, wherein each of the first media file and the received second media file is an image.

11. The electronic device according to claim 10, wherein the circuitry is further configured to:

retrieve at least one color value for each row of a plurality of rows in the received second media file, wherein each row of the plurality of rows corresponds to a set of pixels in the received second media file;

determine a fifth value associated with each row of the plurality of rows, wherein the fifth value is determined based on the retrieved at least one color value; and determine the second information based on the determined fifth value.

12. A method, comprising:

transmitting a request signal to each database of a plurality of databases, wherein the request signal is associated with first information, the first information is associated with a first media file, and each database of the plurality of databases authenticates the request signal;

receiving the first information from each database of the plurality of databases based on the authentication of the request signal;

receiving a second media file corresponding to the first media file;

determining, based on content of the received second media file, second information associated with the received second media file;

comparing the first information received from each database of the plurality of databases;

determining the received first information as unaltered, based on the comparison of the first information received from each database of the plurality of databases;

comparing the received first information and the determined second information;

determining the received second media file as unaltered, based on the comparison of the received first information and the determined second information, and the determination that the received first information is unaltered; and transmitting, to a display device, verification information based on the determination that the received second media file is unaltered.

13. The method according to claim 12, further comprising:

receiving, from each database of the plurality of databases, first meta data associated with the first media file, wherein the first meta data corresponds to the received first information;

determining second meta data based on the determined second information, wherein the second meta data is associated with the received second media file;

comparing the first meta data received from each database of the plurality of databases;

determining the first meta data as unaltered, based on the comparison of the first meta data received from each database of the plurality of databases;

comparing the received first meta data and the determined second meta data; and determining, the received second media file as unaltered, based on the comparison between the received first meta data and the determined second meta data, and the determination that the first meta data is unaltered.

14. The method according to claim 13, wherein the received first meta data includes at least one of a time stamp, a start time, an end time, an identification associated with a media source, an individual login associated with the media source, or a number of data units of the first media file.

15. The method according to claim 12, wherein each of the first media file and the received second media file corresponds to at least one of a pre-recorded video or a live video.

16. The method according to claim 15, further comprising:

retrieving at least one color value of each row in a frame of a plurality of frames, wherein the plurality of frames is associated with the received second media file;

determining a first value for each row in the frame of the plurality of frames, wherein the first value is determined based on the retrieved at least one color value;

combining the determined first value for a specific set of frames of the plurality of frames; and determining a second value based on the combination.

17. The method according to claim 16, further comprising:

retrieving at least one audio value for the plurality of frames;

determining a third value based on the retrieved at least one audio value; and determining the second information based on the determined second value and the determined third value.

18. The method according to claim 12, wherein each of the first media file and the received second media file corresponds to at least one of a pre-recorded audio or a live audio.

19. The method according to claim 18, further comprising:

retrieving at least one audio value for a plurality of frames, wherein the plurality of frames is associated with received second media file;

determining a fourth value based on the retrieved at least one audio value; and determining the second information based on the determined fourth value.

20. A non-transitory computer-readable medium having stored thereon, computer-executable instructions that when executed by an electronic device, causes the electronic device to execute operations, the operations comprising:

transmitting a request signal to each database of a plurality of databases, wherein the request signal is associated with first information, the first information is associated with a first media file, and each database of the plurality of databases authenticates the request signal;

receiving the first information from each database of the plurality of databases based on the authentication of the request signal;

receiving a second media file associated with the first media file;

determining, based on content of the received second media file, second information associated with the received second media file;

comparing the first information received from each database of the plurality of databases;

determining the received first information as unaltered, based on the comparison between the first information received from each database of the plurality of databases;

comparing the received first information and the determined second information;

determining the received second media file as unaltered, based on the comparison of the received first information and the determined second information, and the determination that the received first information is unaltered; and transmitting, to a display device, verification information based on the determination that the received second media file is unaltered.

* * * * *